(12) United States Patent
Silverstein et al.

(10) Patent No.: US 11,501,530 B1
(45) Date of Patent: Nov. 15, 2022

(54) SPATIO-TEMPORAL RELATION BASED MR CONTENT POSITIONING

(71) Applicant: International Business Machines Corporation, Armonk, NY (US)

(72) Inventors: Zachary A. Silverstein, Georgetown, TX (US); Shikhar Kwatra, San Jose, CA (US); Smitkumar Narotambhai Marvaniya, Bangalore (IN); Vijay Ekambaram, Chennai (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/469,731

(22) Filed: Sep. 8, 2021

(51) Int. Cl.
*G06V 20/20* (2022.01)
*G06T 11/00* (2006.01)

(52) U.S. Cl.
CPC ............. *G06V 20/20* (2022.01); *G06T 11/00* (2013.01)

(58) Field of Classification Search
CPC ................................ G06V 20/20; G06T 11/00
See application file for complete search history.

(56) References Cited

U.S. PATENT DOCUMENTS

| 10,007,928 | B2 | 6/2018 | Graham | |
|---|---|---|---|---|
| 10,055,894 | B2 | 8/2018 | Chowdhary | |
| 10,242,486 | B2 | 3/2019 | Sakthivel | |
| 10,543,741 | B2* | 1/2020 | Biderman | ........... B60L 15/2009 |
| 10,854,007 | B2 | 12/2020 | Gawrys | |
| 10,949,882 | B2 | 3/2021 | Du | |
| 10,964,111 | B2 | 3/2021 | Price | |
| 10,997,745 | B2 | 5/2021 | Liu | |
| 2011/0191168 | A1 | 8/2011 | Schroedl | |
| 2011/0246064 | A1* | 10/2011 | Nicholson | .......... G06Q 30/0639 701/467 |
| 2012/0176411 | A1* | 7/2012 | Huston | ................... H04L 67/52 345/633 |
| 2016/0196603 | A1* | 7/2016 | Perez | ....................... G06F 3/16 345/633 |
| 2017/0200316 | A1 | 7/2017 | Giordano | |
| 2018/0025384 | A1 | 1/2018 | Tumey | |

(Continued)

FOREIGN PATENT DOCUMENTS

| CN | 108733339 A | 11/2018 |
|---|---|---|
| WO | 2019173672 A1 | 9/2019 |

OTHER PUBLICATIONS

Wang et al., "A Gesture- and Head-Based Multimodal Interaction Platform for MR Remote Collaboration," International Journal of Advanced Manufacturing Technology, pp. 3031-3043, Nov. 9, 2019.

(Continued)

*Primary Examiner* — Jitesh Patel
(74) *Attorney, Agent, or Firm* — Van Leeuwen & Van Leeuwen; Christopher M. Pignato

(57) ABSTRACT

An approach is provided in which the approach analyzes a visual scene corresponding to a position of a user within a mixed reality environment that includes a set of visible objects in a physical world. The approach determines a set of spatial relationships and a set of temporal relationships between the set of visible objects, and generates an advertisement based on the determined set of spatial relationships and the set of temporal relationships. The approach overlays the advertisement in the mixed reality environment on at least one of the set of visible objects.

17 Claims, 8 Drawing Sheets

(56) References Cited

U.S. PATENT DOCUMENTS

| | | | |
|---|---|---|---|
| 2018/0232464 A1 | 8/2018 | Looney | |
| 2018/0349946 A1 | 12/2018 | Nguyen | |
| 2019/0049950 A1 | 2/2019 | Poornachandran | |
| 2019/0102946 A1* | 4/2019 | Spivack | G06T 19/003 |
| 2019/0311545 A1 | 10/2019 | Kintner | |
| 2019/0347762 A1 | 11/2019 | Hwang | |
| 2020/0159022 A1* | 5/2020 | Park | G02B 27/0172 |
| 2020/0326831 A1* | 10/2020 | Marr | G06F 3/04815 |
| 2020/0401297 A1* | 12/2020 | Tapadia | G06F 3/04815 |
| 2021/0201029 A1* | 7/2021 | Ju | G06Q 30/0643 |
| 2021/0405959 A1* | 12/2021 | Lovitt | G06F 3/167 |

OTHER PUBLICATIONS

Du et al., "Geollery : A Mixed Reality Social Media Platform," CHI Conference on Human Factors in Computing Systems Proceedings (CHI 2019), May 4-9, 2019, Glasgow, Scotland UK, 13 pages.

Buschel et al., "MIRIA: A Mixed Reality Toolkit for the In-Situ Visualization and Analysis of Spatio-Temporal Interaction Data," CHI Conference on Human Factors in Computing Systems (CHI '21), May 8-13, 2021, Yokohama, Japan, 15 pages.

Nebeling et al., "MRAT: The Mixed Reality Analytics Toolkit," CHI Conference on Human Factors in Computing Systems (CHI '20), Apr. 25-30, 2020, Honolulu, HI, USA, 12 pages.

Lang et al., "Virtual Agent Positioning Driven by Scene Semantics in Mixed Reality," IEEE Conference on Virtual Reality and 3D User Interfaces, Osaka, Japan, pp. 1-9, Mar. 23-27, 2019.

Gleb B., "How Augmented Reality Makes Advertising Interactive," Jan. 2020, RubyGarage, 13 pages.

"Collections: VR in Advertising," Ads of the World, Part of the Clio Network, Jun. 2021, 13 pages.

"16 Cool Augmented Reality Advertising Campaigns," Catchoom Technologies, S.L., Dec. 2020, 10 pages.

Enberg, "Global Digital Ad Spending 2019 Digital Accounts for Half of Total Media Ad Spending Worldwide," Insider Intelligence Inc., Mar. 2019, 14 pages.

Roo et al., "Understanding Users' Capability to Transfer Information between Mixed and Virtual Reality: Position Estimation across Modalities and Perspectives," CHI '18—Conference on Human Factors in Computing System, Apr. 2018, Montreal, Canada, 13 pages.

Fulvio et al., "Use of cues in virtual reality depends on visual feedback," Scientific Reports, Nov. 2017, 14 pages.

Lhachemi et al., "Augmented Reality, Cyber-Physical Systems, and Feedback Control for Additive Manufacturing: A Review," Digital Object Identifier, vol. 7, Mar. 2019, pp. 50119-50135.

Lopes et al., "Adding Force Feedback to Mixed Reality Experiences and Games using Electrical Muscle Stimulation," CHI '18— Conference on Human Factors in Computing System, Apr. 2018, Montreal, Canada, 13 pages.

Ajanki et al., "An augmented reality interface to contextual information," Virtual Reality, Jun. 2011, vol. 15, pp. 161-173.

Griffin et al., "Rendering Privacy Aware Advertisements in Mixed Reality Space," U.S. Appl. No. 16/900,300, filed Jun. 12, 2020, International Business Machines Corporation, 37 pages.

* cited by examiner

SPATIO-TEMPORAL RELATION BASED MR CONTENT POSITIONING

BACKGROUND

Virtual reality (VR) is an artificial, computer-generated simulation of a real life environment that immerses a user into a virtual world by making the user feel like the user is experiencing a simulated reality firsthand. Some virtual reality applications include entertainment and education. At times, users capture experiences using multiple cameras that are aligned to capture a complete 360 degree view.

Today's virtual reality systems use virtual reality headsets or multi-projected environments to generate realistic images, sounds, and other sensations that simulate a user's presence in a virtual environment. A person using virtual reality equipment is able to view the virtual world, move around the virtual world, and interact with virtual features or items.

Mixed reality (MR), also referred to as hybrid reality, merges real world and virtual worlds to produce new environments and visualizations where physical and digital objects co-exist and interact in real time. Mixed reality takes place not only in the physical world or the virtual world, but is a mix of reality and virtual reality, encompassing both augmented reality and augmented virtuality.

BRIEF SUMMARY

According to one embodiment of the present disclosure, an approach is provided in which the approach analyzes a visual scene corresponding to a position of a user within a mixed reality environment that includes a set of visible objects in a physical world. The approach determines a set of spatial relationships and a set of temporal relationships between the set of visible objects, and generates an advertisement based on the determined set of spatial relationships and the set of temporal relationships. The approach overlays the advertisement in the mixed reality environment on at least one of the set of visible objects.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
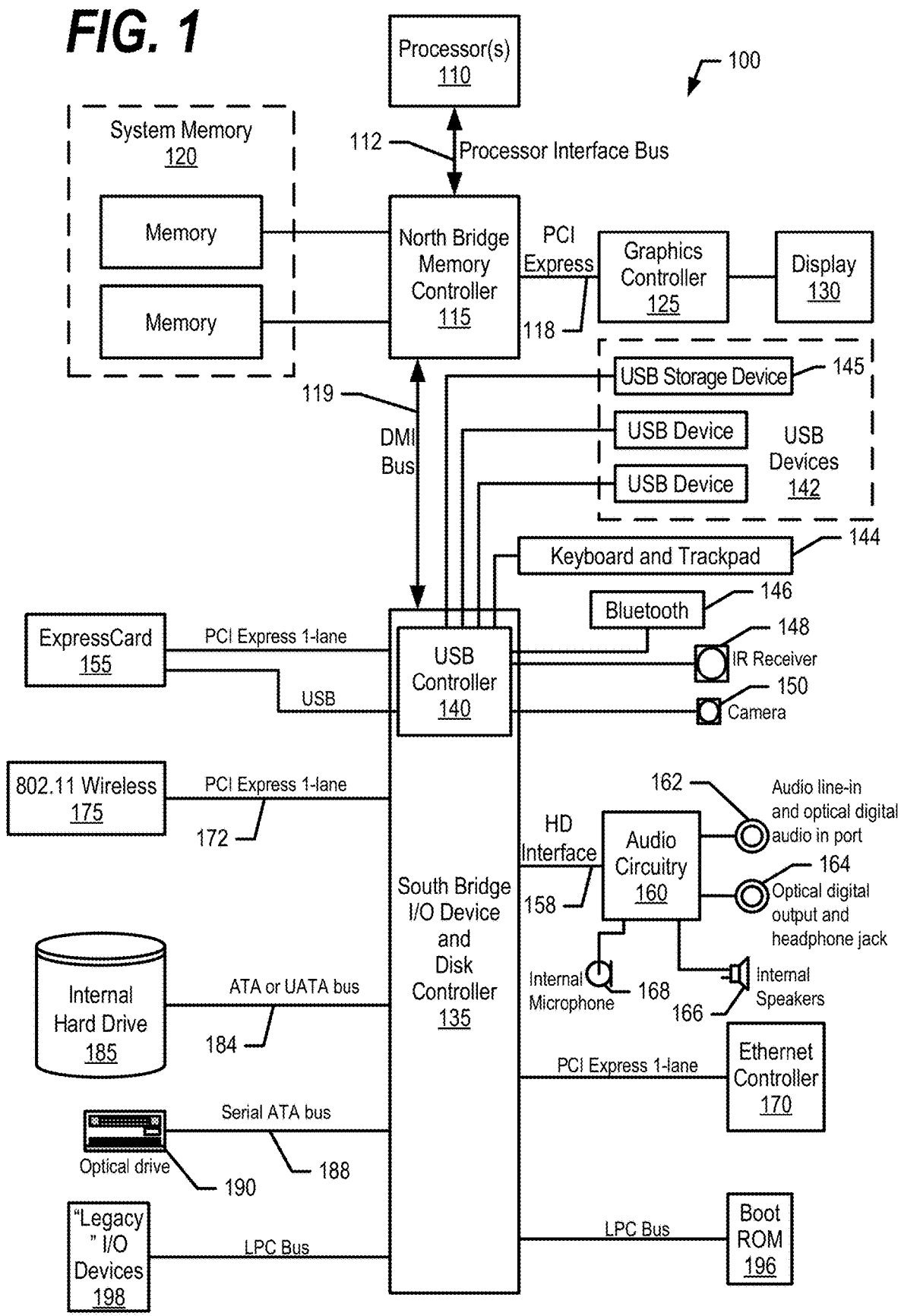
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
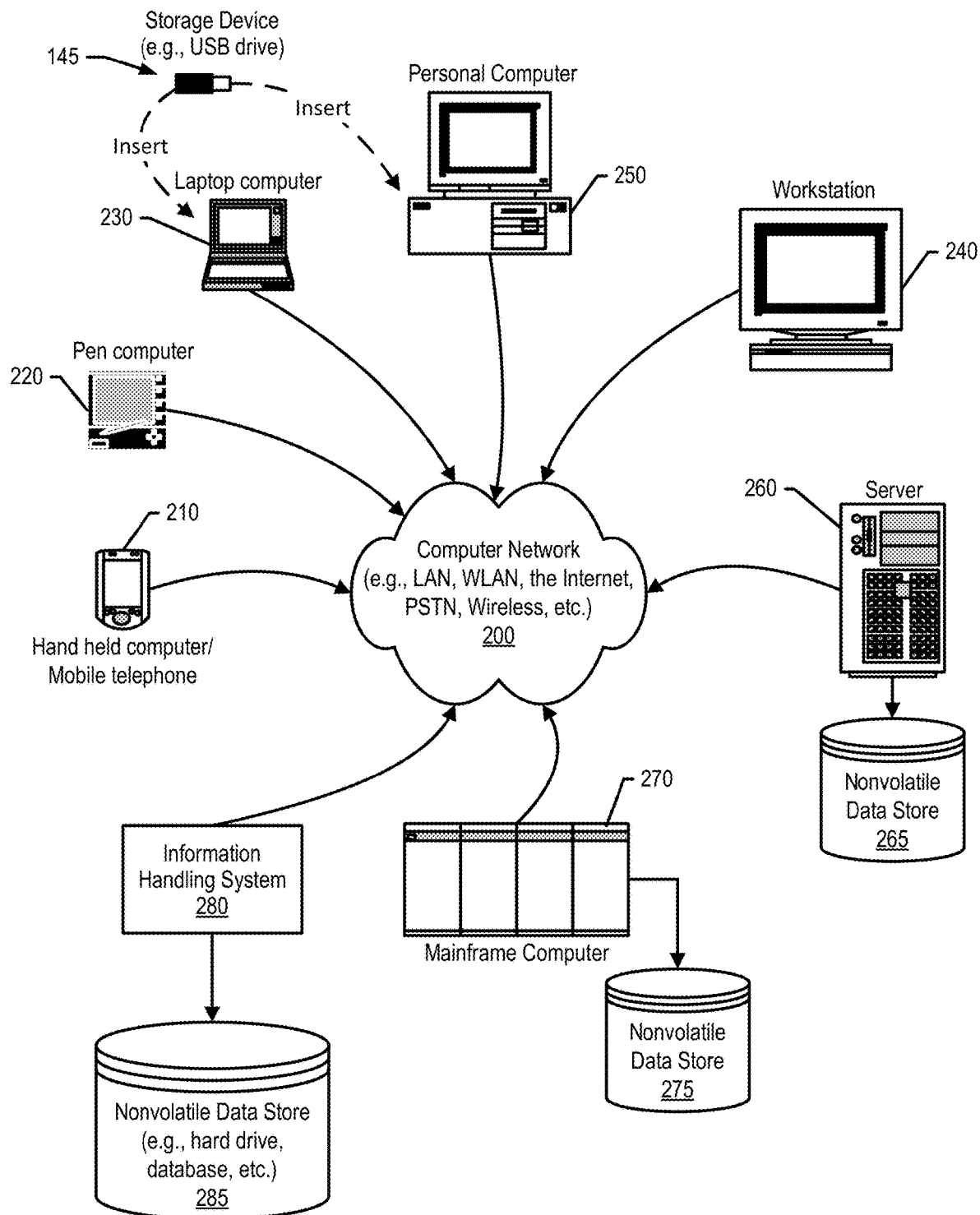
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, mixed reality merges the real world with virtual worlds. To capitalize on the onset of mixed reality technology, advertisement platforms are finding ways to insert advertisements into the mixed reality environment. A challenge found with existing platforms is that although they have the intelligence to position advertisement/notification content related to a physical object in a mixed reality environment, existing platforms are not able to learn spatio-temporal relations across multiple objects and intelligently position advertisements in the mixed reality environment. In addition, existing platforms are not able to adjust and optimize mixed reality advertisement/content rendering parameters such as shape, size, color, and/or viewing angle of the Ads.

FIGS. 3 through 8 depict an approach that can be executed on an information handling system that positions mixed reality advertisements on objects within a mixed reality environment based on spatio-temporal relations between the objects to improve advertisement visibility and increase advertisement rendering space.

As discussed herein, temporal relations pertain to relations in time and spatial relations pertain to relations in space. For example, when a user watches television, the user also views the remote control in the same timeframe (temporal relations). As such, STRB advertisement generation system 330 identifies the temporal relations and overlays advertisements on the remote control when the user watches television. In addition, the user also views other objects near the television while the user is watching the television, such as an entertainment center (spatial relations). As such, STRB advertisement generation system 330 identifies the spatial relations and overlays advertisements on the surrounding objects when the user watches television.

Figure 3:
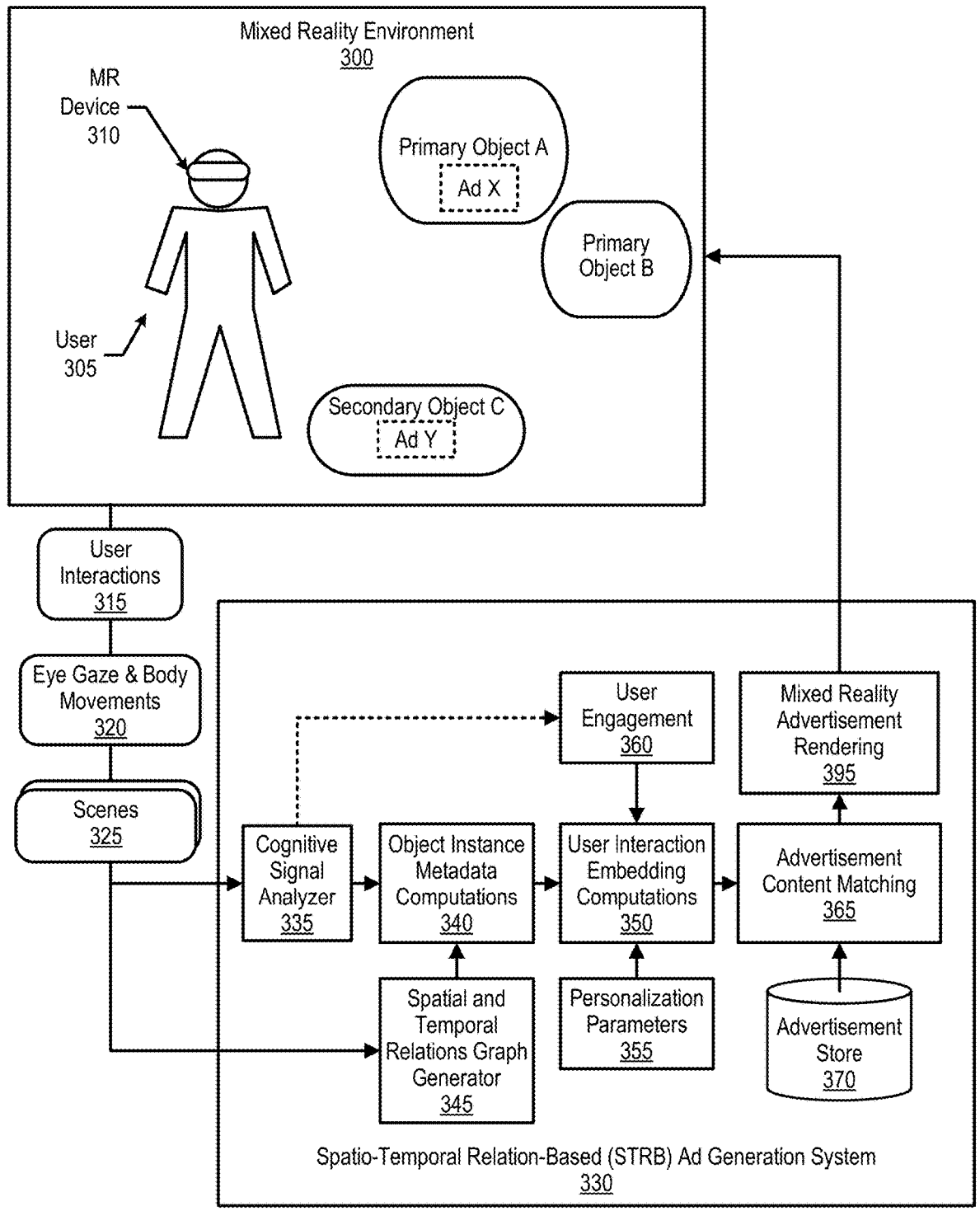
FIG. 3 is an exemplary diagram of positioning advertisements on objects in a mixed reality environment based on spatio-temporal analysis.

FIG. 3 is an exemplary diagram of positioning advertisements on objects in a mixed reality environment based on spatio-temporal analysis. Spatio-temporal relation-based (STRB) advertisement generation system 330 provides an approach of positioning mixed reality advertisements based on spatio-temporal relations across objects captured in mixed reality environment 300. In this embodiment, STRB advertisement generation system 330 analyzes the visual scene and identifies important object and its relationship with respect to other objects.

User 305 wears mixed reality device 310 to enter mixed reality environment 300. Mixed reality environment 300 includes primary object A, primary object B, and secondary objects C, each of which are objects within the physical world (e.g., television, entertainment center, remote control, etc.). As user 305 moves around mixed reality environment 300, or device 310 captures user interactions 315, eye gaze and body movements 320, and scenes 325, which feed into spatio-temporal relation based ad generation system 330.

Spatial and temporal relations graph generator 345 analyzes user interactions 315, eye gaze and body movements 320, and scenes 325 to generate a spatial relations graph and a temporal relations graph. The spatial relations graph indicates the spatial relations between objects, and the temporal relations graph indicates the temporal relations between objects (see FIG. 4 and corresponding text for further details). The output of spatial and temporal relations graph generator 345 feeds into object instance metadata 340.

In addition, cognitive signal analyzer 335 evaluates user interactions 315 and eye gaze and body movements 320, and the output of cognitive signal analyzer 335 feeds into object instance metadata computations 340. Object instance metadata computations 340 computes object instance metadata that captures various aspects of viewability details of mixed reality environment 300 by learning a spatial and temporal relation across objects. In one embodiment, the object instance metadata includes object shape, object size, object color, relationships with the neighboring objects, partial occlusion score, histogram representing user depth from objects, user interaction information with the object and neighboring objects, user visibility score of an object, and/or temporal relations across the objects.

The output of object instance metadata computations 340 feeds into user interaction embedding computations 350. Personalization parameters 355 and user engagement 360 also feed into user interaction embedding computations 350. User interaction embedding computations 350 computes node embeddings by analyzing local structures within graphs using, in one embodiment, a graph2vec approach. In one embodiment, user interaction embedding computations 350 computes user interaction embeddings for each of the objects based on aspects such as object visibility score, objects with similar spatial and temporal embeddings, user 305's personalization parameters 355, and user 305's distance and viewing angle with respect to the objects.

The output of user interaction embedding computations 350 feeds into advertisement content matching 365, which searches for advertisement content in advertisement store 370 based on user interaction embeddings. The output of advertisement content matching 365 feeds into mixed reality advertisement rendering 395, which renders mixed reality advertisements based on a viewability score (see FIG. 8 and corresponding text for further details). FIG. 3 shows that the mixed reality advertisements X and Y are overlaid onto primary object A and secondary object C, respectively.

In one embodiment, STRB advertisement generation system 330 learns advertisement rendering parameters such that the advertisement visibility improves and maximizes the advertisement rendering space. In this embodiment, STRB advertisement generation system 330 estimates the advertisement rendering parameters based on user 305's interactions along with a viewability score by solving a joint optimization that improves the advertisement visibility and increases advertisement rendering space.

In one embodiment, STRB advertisement generation system 330 re-computes advertisement rendering parameters based on a relative change with respect to a set of objects in mixed reality environment 300. Advertisement rendering parameters include scale, position, viewing angle, transparency level, color, light and shade (see FIG. 8 and corresponding text for further details). STRB advertisement generation system 330 identifies the best possible animation for the advertisement content by analyzing the visual scenes and user 305's interactions in mixed reality environment 300.

Figure 4:
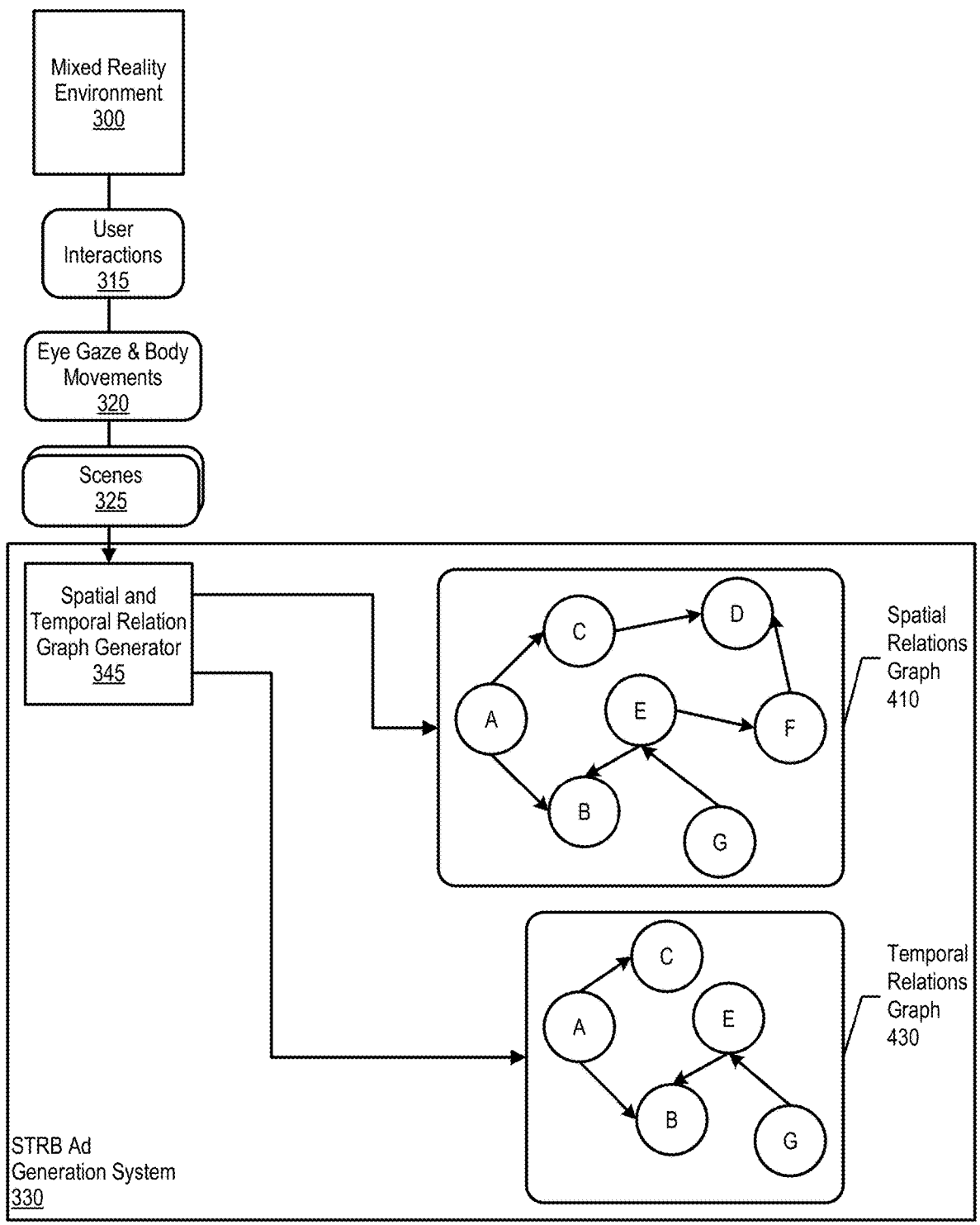
FIG. 4 is an exemplary diagram depicting spatio-temporal relation-based (STRB) advertisement generation system identifying spatial and temporal relations across objects in scenes and constructing a spatial relations graph and a temporal relation.

FIG. 4 is an exemplary diagram depicting STRB advertisement generation system 330 identifying spatial and temporal relations across objects in scenes and constructing a spatial relations graph and a temporal relation.

Spatial and temporal relations graph generator 345 extracts objects from scenes 325 and generates spatial relations graph 410 and temporal relations graph 430. Spatial relations graph 410 maps neighboring objects within a certain range that form a relationship as a part of spatial relations graph 410. For example, when user 305 watches TV, user 305 will also view objects near the TV. As such, STRB advertisement generation system 330 overlays rendered content/advertisements on objects surrounding the TV.

Temporal relations graph 430 identifies temporal relations by learning second order inferences from user interactions 315 and/or eye gaze and body movements 320. For example, when user 305 watches TV, STRB advertisement generation system 330 detects user 305 also viewing the TV remote control. As such, STRB advertisement generation system 330 overlays rendered content/advertisements on the TV remote control.

Figure 5:
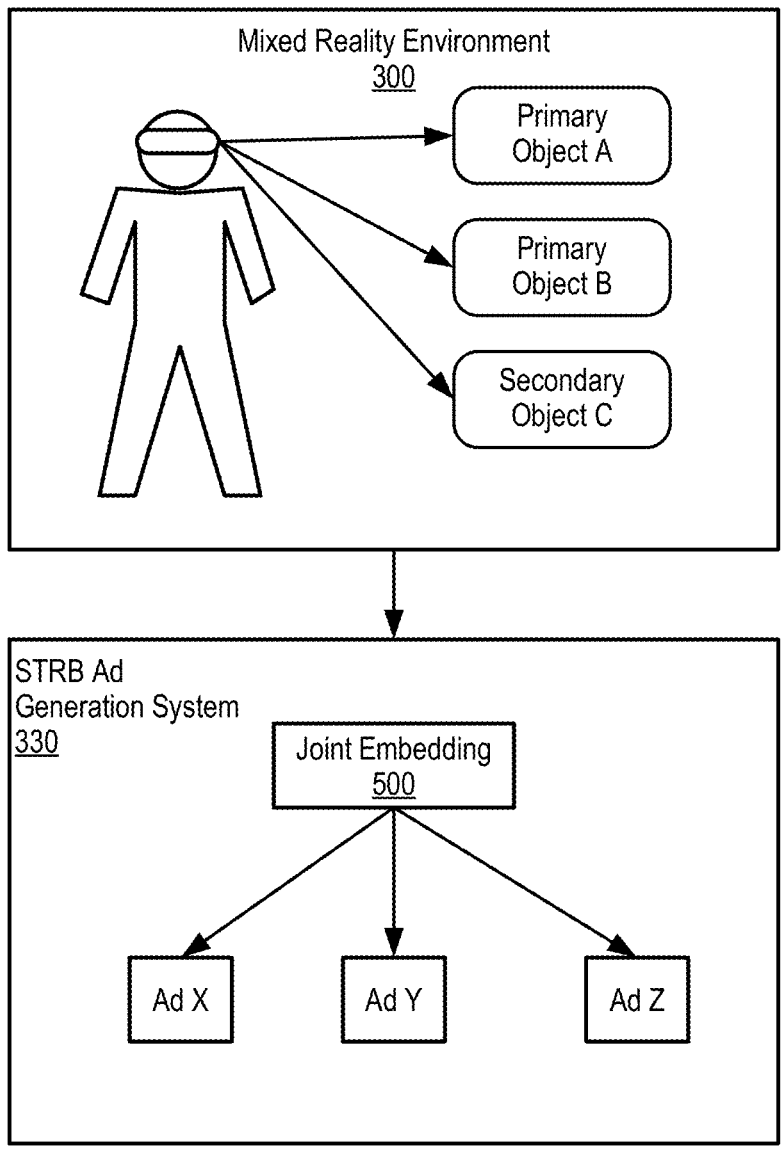
FIG. 5 is an exemplary diagram depicting the STRB advertisement generation system creating a joint embedding to map objects to advertisements.

FIG. 5 is an exemplary diagram depicting STRB advertisement generation system 330 creating a joint embedding to map objects to advertisements. In one embodiment, when STRB advertisement generation system 330 performs user interaction embedding computations 350, STRB advertisement generation system 330 analyzes user 305's current position in mixed reality environment 300 and the relation with respect to primary object A, primary object B, and secondary object C.

STRB advertisement generation system 330 then learns a joint embedding (joint embedding 500) that captures the relation between primary object A, primary object B, and secondary object C, and the advertisement content representations in advertisement X, Y, and Z to capture user interactions in mixed reality environment 300. In this embodiment, STRB advertisement generation system 330 trains a deep learning model by collecting a set of user interactions aligned with mixed reality advertisement content that captures positive and negative mixed reality advertisements.

Figure 6:
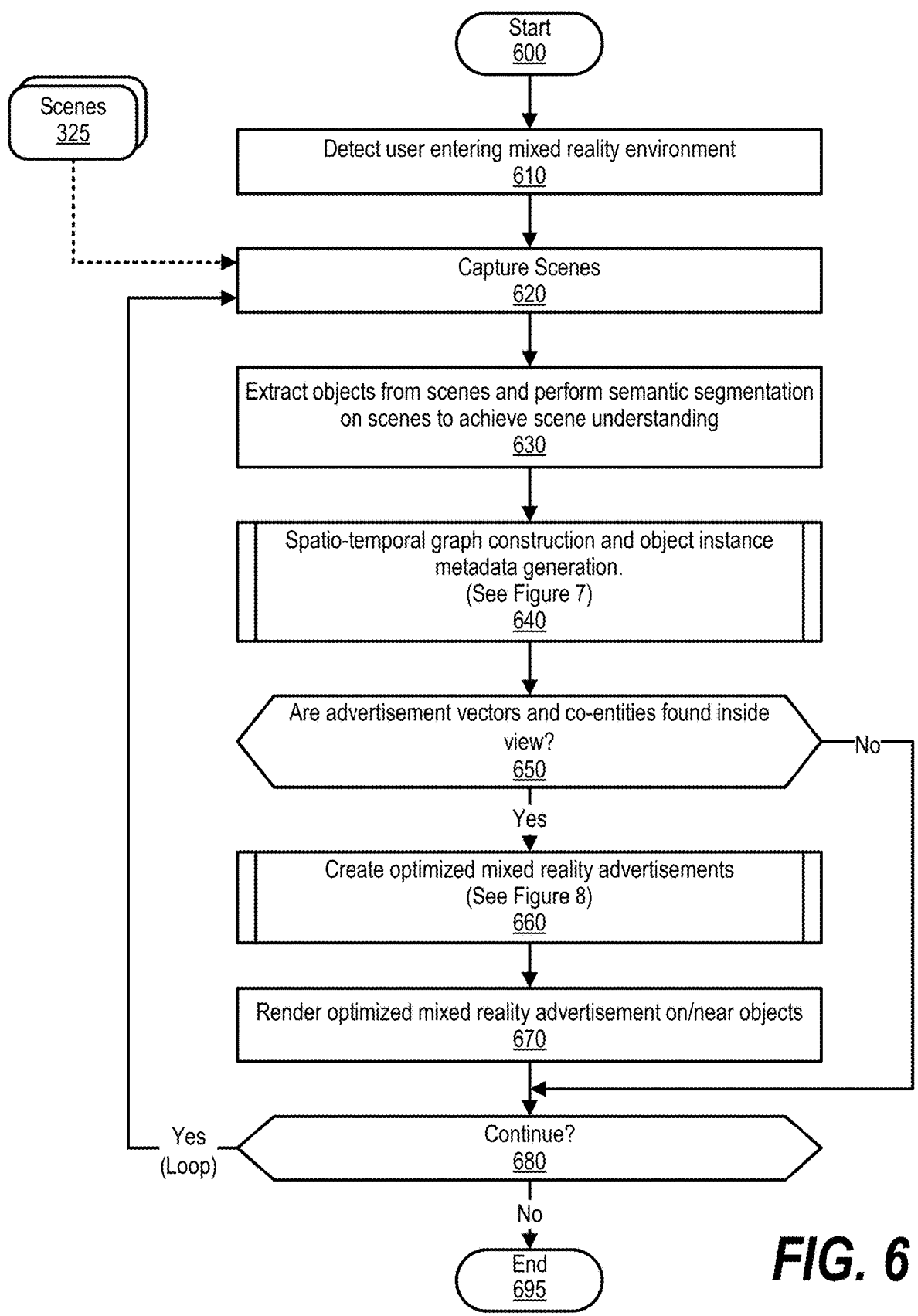
FIG. 6 is an exemplary flowchart showing steps taken to evaluate a user's mixed reality environment and optimize advertisement rendering in the mixed reality environment based on spatio-temporal analysis.

FIG. 6 is an exemplary flowchart showing steps taken to evaluate a user's mixed reality environment and optimize advertisement rendering in the mixed reality environment based on spatio-temporal analysis. FIG. 6 processing commences at 600 whereupon, at step 610, the process detects user 305 entering mixed reality environment 300. At step 620, the process captures scenes in mixed reality environment 300 and, at step 630, the process extracts objects from the captured scenes and performs semantic segmentation on the scenes to achieve scene understanding.

Figure 7:
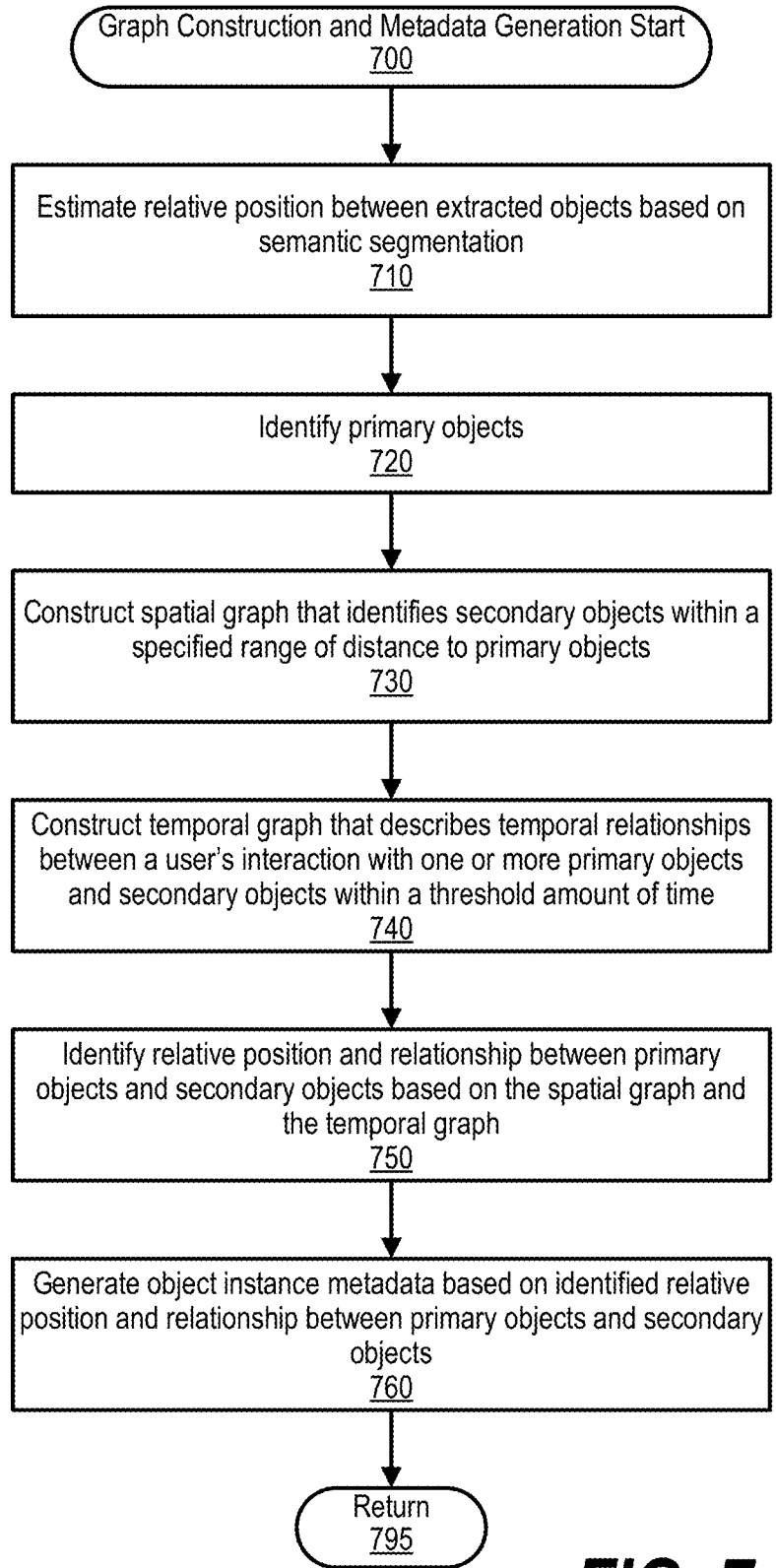
FIG. 7 is an exemplary flowchart showing steps taken to construct spatial relations graphs, temporal relations graphs, and generate object metadata.

At predefined process 640, the process performs spatio-temporal graph construction and object instance metadata generation (see FIG. 7 and corresponding text for processing details). The process determines as to whether there are advertisement vectors and co-entities found inside user 305's view of mixed reality environment 300 (decision 650).

In one embodiment, decision 650 allows STRB advertisement generation system 330 to know when and where to cast the AR content of alternative items. By checking advertisement vectors and co-entities inside a view, STRB advertisement generation system 330 determines if and what to show. For example, an advertising vector might be anywhere where STRB advertisement generation system 330 wishes to show a pretzel advertisement, and a co-entity is a can of soda. In this example, if the can of soda (co-entity) is in view, the vector to display the advertisement may be on a counter or adjacent to the counter. In another example, a dishwasher may be a co-entity and the advertisement vector is an opened dishwasher that takes liquid detergent. In this example, the advertisement vector corresponds to a specific slot in the dishwasher to put the detergent pack and shows how much easier inserting a detergent pack is than filling the slot with liquid.

Figure 8:
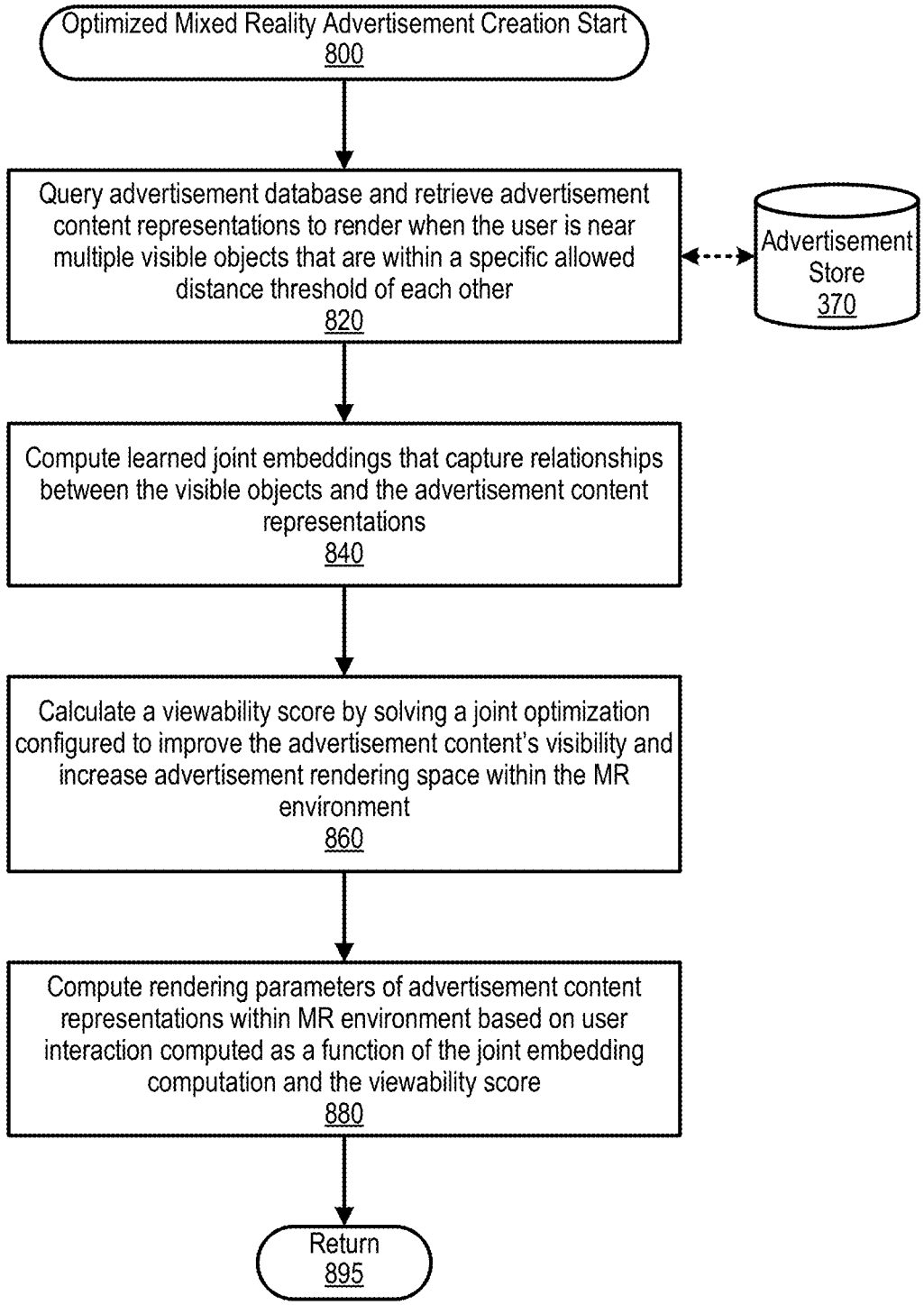
FIG. 8 is an exemplary diagram showing steps taken to create optimized mixed reality advertisements.

If there are advertisement vectors and co-entities found inside user 305's view of mixed reality environment 300, then decision 650 branches to the 'yes' branch whereupon, at predefined process 660, the process creates optimized mixed reality advertisements for mixed reality environment 300 (see FIG. 8 and corresponding text for processing details). At step 670, the process renders the optimized advertisements on or near objects, which may include primary objects and secondary objects (co-entities). On the other hand, if there are not advertisement vectors and co-entities found inside user 305's view of mixed reality environment 300, then decision 650 branches to the 'no' branch bypassing steps 660 and 670.

The process determines as to whether to continue (decision 680). If the process should continue, then decision 680 branches to the 'yes' branch which loops back to capture more scenes from user 305's view of mixed reality environment 300. This looping continues until the process should terminate, at which point decision 680 branches to the 'no' branch exiting the loop. FIG. 6 processing thereafter ends at 695.

FIG. 7 is an exemplary flowchart showing steps taken to construct spatial relations graphs, temporal relations graphs, and generate object metadata. FIG. 7 processing commences at 700 whereupon, at step 710, the process estimates relative positions between extracted objects based on semantic segmentation. At step 720, the process identifies primary objects, such as a television.

At step 730, the process constructs spatial relations graph 410 that identifies secondary objects within a specified range of distance to the primary objects. At step 740, the process constructs temporal relations graph 430 that describes temporal relationships between user 305's interaction with one or more primary objects and secondary objects within a threshold amount of time.

At step 750, the process identifies relative positions and relationships between the primary objects and the secondary objects based on spatial relations graph 410 and temporal relations graph 430. At step 760, the process generates object instance metadata based on the identified relative positions and relationships between the primary objects and the secondary objects (e.g., television and remote control). FIG. 7 processing thereafter returns to the calling routine (see FIG. 6) at 795.

FIG. 8 is an exemplary diagram showing steps taken to create optimized mixed reality advertisements. FIG. 8 processing commences at 800 whereupon, at step 820, the process queries advertisement database store 370 and retrieves advertisement content representations to render when user 305 is near multiple visible objects that are within a specific allowed distance threshold of each other.

At step 840, the process computes learned joint embeddings that capture relationships between the visible objects and the advertisement content representations as discussed herein. At step 860, the process calculates a viewability score by solving a joint optimization configured to improve the advertisement content's visibility and increase advertisement rendering space within the mixed reality environment.

At step 880, the process computes rendering parameters of advertisement content representations within the mixed reality environment based on user 305's interaction computed as a function of the joint embedding computation and the viewability score. FIG. 8 processing thereafter returns to the calling routine (see FIG. 6) at 895.

In one embodiment, STRB advertisement generation system 330 identifies a set of advertisement content by analyzing the user interactions where each of the set of advertisement content is linked with the set of objects present in the visual scene based on its spatio-temporal relationships. STRB advertisement generation system 330 then learns advertisement content rendering parameters by solving a joint optimization using constraints such as i) identify position and size of the advertisement content i based on user's implicit feedback; ii) do not overlap the identified advertisement content in mixed reality space; iii) identify viewing angle for each of the advertisement content to maximize the advertisement visual interpretation of the advertisement content; iv) identify a binary flag for each of the advertisement content to assist animation; and v) total content rendering space is within a threshold. In turn, the joint optimization is solved using linear programming by maximizing the advertisement content viewability score along with maximizing the content rendering space.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
analyzing a visual scene corresponding to a position of a user within a mixed reality environment, wherein the visual scene comprises a set of visible objects in a physical world;
determining a set of spatial relationships and a set of temporal relationships between the set of visible objects;
generating a set of object instance metadata for each of the set of visible objects based on the set of spatial relationships and the set of temporal relationships;
determining that at least two of the set of visible objects are within a first predetermined distance from each other based on the set of object instance metadata;
generating an advertisement based on the set of spatial relationships and the set of temporal relationships between the set of visible objects; and
overlaying, in the mixed reality environment, the advertisement on at least one of the set of visible objects.

2. The computer-implemented method of claim 1 further comprising:
constructing a spatial graph that describes the set of spatial relationships, wherein the spatial graph is based on a set of distances in the mixed reality environment between the set of visible objects comprising one or more primary objects and one or more secondary objects;
constructing a temporal graph that describes the set of temporal relationships, wherein the temporal graph is based on a timeframe that the user views the one or more primary objects and the one or more secondary objects; and
generating the advertisement to overlay on one of the one or more secondary objects based on the spatial graph and the temporal graph.

3. The computer-implemented method of claim 1 further comprising:
detecting that the user is within a second predetermined distance from the at least two visible objects; and
generating the advertisement in response to determining that the at least two visible objects are within a first predetermined distance from each other and detecting that the user is within the second predetermined distance from the at least two visible objects.

4. The computer-implemented method of claim 1 further comprising:
capturing a set of user interactions within the mixed reality environment;
selecting a set of advertisement content based on the captured set of user interactions;
computing a joint embedding based on the set of object instance metadata that indicates a relationship between the set of visible objects and the set of advertisement content;
calculating a viewability score in response to solving a joint optimization that comprises a set of constraints to improve a visibility of the set of advertisement content in the mixed reality environment;
computing a set of rendering parameters of the advertisement within the mixed reality environment based on the joint embedding and the viewability score; and
applying the set of rendering parameters to the set of advertisement content to generate the advertisement.

5. The computer-implemented method of claim 4 further comprising:
solving the joint optimization to increase an advertisement rendering space within the mixed reality environment and improve the visibility of the set of advertisement content within the mixed reality environment.

6. The computer-implemented method of claim 4 further comprising:
re-computing the set of rendering parameters based on one or more relative changes with respect to the set of visible objects, wherein the one or more relative changes are selected from the group consisting of an optimizing scale, a user position, and a viewing angle of the advertisement relative to the user.

7. An information handling system comprising:
one or more processors;
a memory coupled to at least one of the processors;
a set of computer program instructions stored in the memory and executed by at least one of the processors in order to perform actions of:
analyzing a visual scene corresponding to a position of a user within a mixed reality environment, wherein the visual scene comprises a set of visible objects in a physical world;
determining a set of spatial relationships and a set of temporal relationships between the set of visible objects;
generating a set of object instance metadata for each of the set of visible objects based on the set of spatial relationships and the set of temporal relationships;
determining that at least two of the set of visible objects are within a first predetermined distance from each other based on the set of object instance metadata;
generating an advertisement based on the set of spatial relationships and the set of temporal relationships between the set of visible objects; and
overlaying, in the mixed reality environment, the advertisement on at least one of the set of visible objects.

8. The information handling system of claim 7 wherein the processors perform additional actions comprising:
constructing a spatial graph that describes the set of spatial relationships, wherein the spatial graph is based on a set of distances in the mixed reality environment between the set of visible objects comprising one or more primary objects and one or more secondary objects;
constructing a temporal graph that describes the set of temporal relationships, wherein the temporal graph is based on a timeframe that the user views the one or more primary objects and the one or more secondary objects; and
generating the advertisement to overlay on one of the one or more secondary objects based on the spatial graph and the temporal graph.

9. The information handling system of claim 7 wherein the processors perform additional actions comprising:
detecting that the user is within a second predetermined distance from the at least two visible objects; and generating the advertisement in response to determining that the at least two visible objects are within a first predetermined distance from each other and detecting that the user is within the second predetermined distance from the at least two visible objects.

10. The information handling system of claim 7 wherein the processors perform additional actions comprising:
  capturing a set of user interactions within the mixed reality environment;
  selecting a set of advertisement content based on the captured set of user interactions;
  computing a joint embedding based on the set of object instance metadata that indicates a relationship between the set of visible objects and the set of advertisement content;
  calculating a viewability score in response to solving a joint optimization that comprises a set of constraints to improve a visibility of the set of advertisement content in the mixed reality environment;
  computing a set of rendering parameters of the advertisement within the mixed reality environment based on the joint embedding and the viewability score; and
  applying the set of rendering parameters to the set of advertisement content to generate the advertisement.

11. The information handling system of claim 10 wherein the processors perform additional actions comprising:
  solving the joint optimization to increase an advertisement rendering space within the mixed reality environment and improve the visibility of the set of advertisement content within the mixed reality environment.

12. The information handling system of claim 10 wherein the processors perform additional actions comprising:
  re-computing the set of rendering parameters based on one or more relative changes with respect to the set of visible objects, wherein the one or more relative changes are selected from the group consisting of an optimizing scale, a user position, and a viewing angle of the advertisement relative to the user.

13. A computer program product stored in a computer readable storage medium, comprising computer program code that, when executed by an information handling system, causes the information handling system to perform actions comprising:
  analyzing a visual scene corresponding to a position of a user within a mixed reality environment, wherein the visual scene comprises a set of visible objects in a physical world;
  determining a set of spatial relationships and a set of temporal relationships between the set of visible objects;
  generating a set of object instance metadata for each of the set of visible objects based on the set of spatial relationships and the set of temporal relationships;
  determining that at least two of the set of visible objects are within a first predetermined distance from each other based on the set of object instance metadata;
  generating an advertisement based on the set of spatial relationships and the set of temporal relationships between the set of visible objects; and
  overlaying, in the mixed reality environment, the advertisement on at least one of the set of visible objects.

14. The computer program product of claim 13 wherein the information handling system performs further actions comprising:
  constructing a spatial graph that describes the set of spatial relationships, wherein the spatial graph is based on a set of distances in the mixed reality environment between the set of visible objects comprising one or more primary objects and one or more secondary objects;
  constructing a temporal graph that describes the set of temporal relationships, wherein the temporal graph is based on a timeframe that the user views the one or more primary objects and the one or more secondary objects; and
  generating the advertisement to overlay on one of the one or more secondary objects based on the spatial graph and the temporal graph.

15. The computer program product of claim 13 wherein the information handling system performs further actions comprising:
  detecting that the user is within a second predetermined distance from the at least two visible objects; and
  generating the advertisement in response to determining that the at least two visible objects are within a first predetermined distance from each other and detecting that the user is within the second predetermined distance from the at least two visible objects.

16. The computer program product of claim 13 wherein the information handling system performs further actions comprising:
  capturing a set of user interactions within the mixed reality environment;
  selecting a set of advertisement content based on the captured set of user interactions;
  computing a joint embedding based on the set of object instance metadata that indicates a relationship between the set of visible objects and the set of advertisement content;
  calculating a viewability score in response to solving a joint optimization that comprises a set of constraints to improve a visibility of the set of advertisement content in the mixed reality environment;
  computing a set of rendering parameters of the advertisement within the mixed reality environment based on the joint embedding and the viewability score; and
  applying the set of rendering parameters to the set of advertisement content to generate the advertisement.

17. The computer program product of claim 16 wherein the information handling system performs further actions comprising:
  solving the joint optimization to increase an advertisement rendering space within the mixed reality environment and improve the visibility of the set of advertisement content within the mixed reality environment.

\* \* \* \* \*